United States Patent [19]

Agostinelli et al.

[11] Patent Number: 5,568,216
[45] Date of Patent: Oct. 22, 1996

[54] FILM CARTRIDGE WITH VISUAL INDICATOR FOR VERIFYING FILM LOADING IN CAMERA AND WITH PROTECTOR SHIELD FOR FILM FRAME DURING EXPOSURE IN CAMERA

[75] Inventors: John A. Agostinelli; Madhav Mehra, both of Rochester, N.Y.

[73] Assignee: Eastman Kodak Company, Rochester, N.Y.

[21] Appl. No.: 584,445

[22] Filed: Jan. 11, 1996

[51] Int. Cl.⁶ ............................ G03B 17/26; G03B 23/02
[52] U.S. Cl. ............................ 396/515; 242/348; 396/516
[58] Field of Search ............................ 354/275, 289.1; 242/348, 348.4

[56] References Cited

U.S. PATENT DOCUMENTS

| | | | |
|---|---|---|---|
| 1,836,699 | 12/1931 | Wood | 354/275 |
| 4,335,948 | 6/1982 | Cocco | 354/275 |
| 4,488,796 | 12/1984 | Edwards | 354/275 |
| 4,875,638 | 10/1989 | Harvey | 242/71.1 |
| 4,887,110 | 12/1989 | Harvey | 354/275 |
| 4,894,673 | 1/1990 | Beach | 354/275 |
| 5,030,978 | 7/1991 | Stoneham et al. | 354/275 |
| 5,032,861 | 7/1991 | Pagano | 354/275 |
| 5,255,039 | 10/1993 | Miller | 354/275 |
| 5,264,886 | 11/1993 | Byrd | 354/275 |
| 5,278,600 | 1/1994 | Takahashi et al. | 354/275 |
| 5,285,227 | 2/1994 | Lawther et al. | 354/275 |

*Primary Examiner*—Michael L. Gellner
*Assistant Examiner*—John Chizmar
*Attorney, Agent, or Firm*—Roger A. Fields

[57] ABSTRACT

A film cartridge comprises a housing with a film exit slit, and a film roll support rotatable inside the housing to unwind a filmstrip beginning with a film leader to permit the film leader to be moved outwardly through the slit to accomplish film loading in a camera. According to one feature of the invention a protective strip is provided with a length and a width dimensioned to permit the protective strip to completely cover a non-emulsion side of successive frames of the filmstrip when individual ones of the frames are positioned outside the housing for exposure in a camera. The protective strip has a forward end portion releaseably secured to the film leader and a trailing end portion permanently secured to the housing to make the film leader first pull the protective strip onto the non-emulsion side of the filmstrip as the film leader is moved outwardly through the slit and then disconnect from the protective strip as the film leader is moved further from the housing, in order that the protective strip will remain on the non-emulsion side of the filmstrip to shield the non-emulsion side of individual ones of the frames when individual ones of the frames are positioned outside the housing for exposure in a camera. According to another feature of the invention the film cartridge includes a visible film-loaded indicator located on the housing to be seen through a window in a camera, and the protective strip is originally covering the film-loaded indicator but is pulled off the film-loaded indicator when it is pulled onto the non-emulsion side of the filmstrip as the film leader is moved outwardly through the slit.

4 Claims, 6 Drawing Sheets

FILM CARTRIDGE WITH VISUAL INDICATOR FOR VERIFYING FILM LOADING IN CAMERA AND WITH PROTECTOR SHIELD FOR FILM FRAME DURING EXPOSURE IN CAMERA

CROSS-REFERENCE TO RELATED APPLICATIONS

Reference is made to commonly assigned copending applications Ser. No. 08/584480, entitled FILM CARTRIDGE WITH VISUAL INDICATOR FOR VERIFYING FILM LOADING IN CAMERA and filed Jan. 11, 1996 in the names of Joseph A. Manico and Dwight J. Petruchik, Ser. No. 08/584853, entitled FILM CARTRIDGE WITH VISUAL INDICATOR FOR VERIFYING FILM LOADING IN CAMERA and filed Jan. 11, 1996 in the names of Joseph A. Manico and Madhay Mehra, and Ser. No. 08/449032, entitled FILM SPOOL WITH BUILT-IN AUDIBLE INDICATOR FOR VERIFYING FILM LOADING IN CAMERA and filed May 24, 1995 in the name of Joseph A. Manico.

FIELD OF THE INVENTION

The invention relates generally to the field of photography, and in particular to a film cartridge with a visual indicator for verifying film loading in a camera and with a protector shield for each film frame during exposure in the camera.

BACKGROUND OF THE INVENTION

To load most 35 mm cameras, a film cartridge is inserted in a loading chamber of the camera and the forward end portion of a film leader protruding from a light-trapping slit in the cartridge is placed over a take-up spool in the camera. In some cameras, the forward end portion of the film leader is manually attached to the take-up spool before a rear door of the camera is closed. Then, a film loading or winding operation is performed, for example, by manually pivoting a winding lever for the take-up spool and manually depressing a shutter release button several times. This is done until the entire leader is unwound from a supply spool inside the cartridge and is wound onto the take-up spool, and the first-available film frame is positioned for exposure. In other cameras, the forward end portion of the film leader is automatically secured to the take-up spool at the beginning of the film loading operation. As the take-up spool is rotated via a motor drive, for example, one or more circumferential teeth of the spool engage the forward end portion of the film leader at its perforations to wind the leader onto the spool and position the first-available film frame for exposure. A spring-like deflector or other suitable means may be provided on the rear door of the camera for pressing the film leader against the take-up spool to facilitate engagement of the forward end portion of the leader by the circumferential teeth of the spool.

One problem that exists in some 35 mm cameras is that even though the photographer believes the forward end portion of the film leader is secured to the take-up spool, the forward end portion may fail to be engaged with the spool or may become disengaged from the spool during the film loading operation. As a result, the film leader will not be wound onto the take-up spool and the first-available film frame cannot be positioned for exposure. However, since the rear door of the camera is closed, the photographer may not be aware of the malfunction.

Another problem that exists in some 35 mm cameras occurs because the non-emulsion side of the film frame that is positioned for exposure is supported on a film platen in order to hold the film frame flat during exposure. As a result, movement of the film frame onto the platen to position the film frame for exposure may cause some slight scratching of the non-emulsion side of the film frame.

SUMMARY OF THE INVENTION

According to one feature of the invention a film cartridge comprising a housing with a film exit slit, and a film roll support rotatable inside the housing to unwind a filmstrip beginning with a film leader to permit the film leader to be moved outwardly through the slit to accomplish film loading in a camera, is characterized by:

a protective strip with a length and a width dimensioned to permit the protective strip to completely cover a non-emulsion side of successive frames of the filmstrip when individual ones of the frames are positioned outside the housing for exposure in a camera, the protective strip having a forward end portion releaseably secured to the film leader and a trailing end portion permanently secured to the housing to make the film leader first pull the protective strip onto the non-emulsion side of the filmstrip as the film leader is moved outwardly through the slit and then disconnect from the protective strip as the film leader is moved further from the housing, whereby the protective strip will remain on the non-emulsion side of the filmstrip to shield the non-emulsion side of individual ones of the frames when individual ones of the frames are positioned outside the housing for exposure in a camera.

According to another feature of the invention the film cartridge includes a visible film-loaded indicator located on the housing to be seen through a window in a camera, and the protective strip is originally covering the film-loaded indicator but is pulled off the film-loaded indicator when it is pulled onto the non-emulsion side of the filmstrip as the film leader is moved outwardly through the slit.

DETAILED DESCRIPTION OF THE INVENTION

Figure 1:
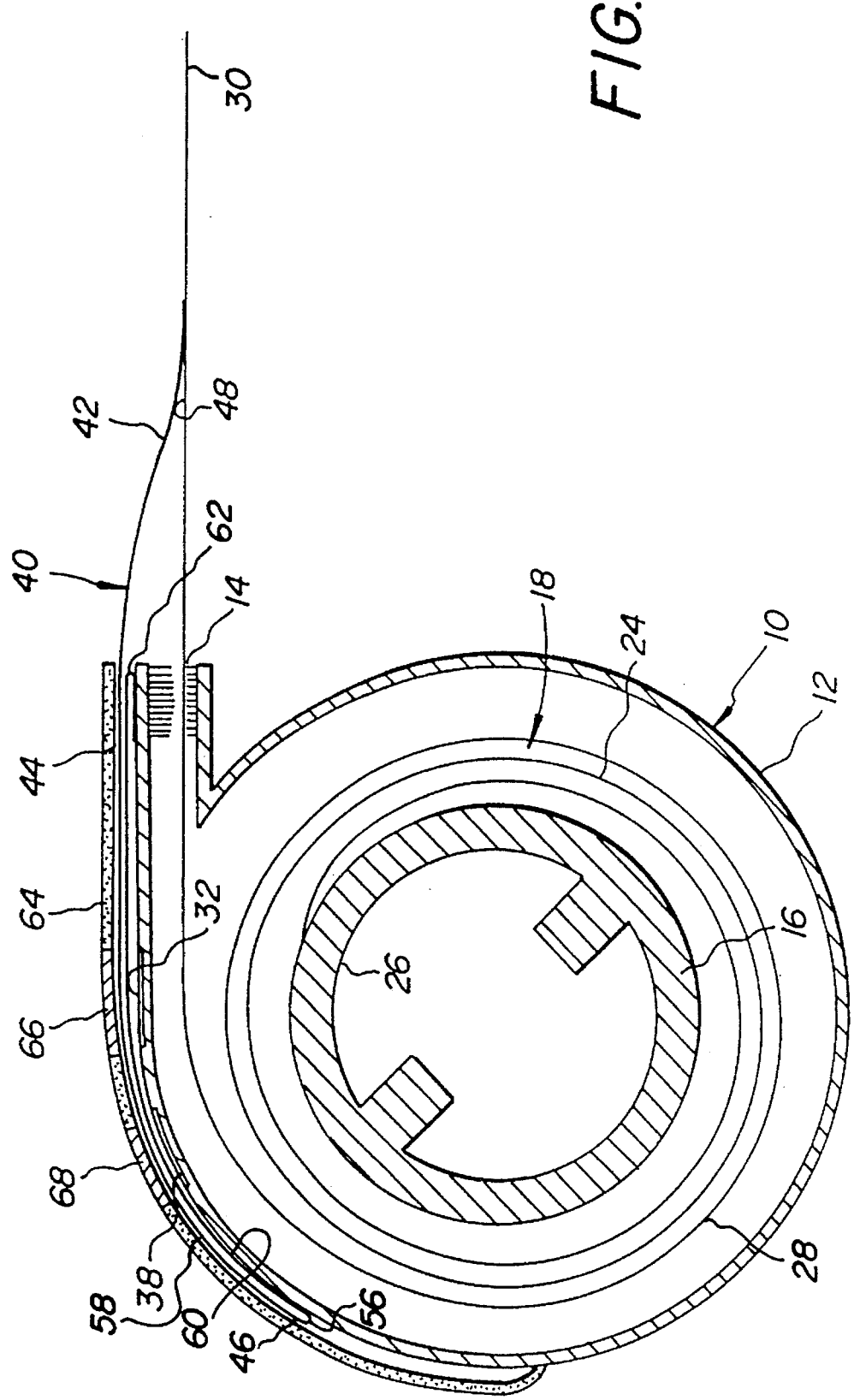
FIGS. 1, 2 and 3 are partial section views of a film cartridge according to a preferred embodiment of the invention, showing the cartridge in various stages of operation.
Figure 2:
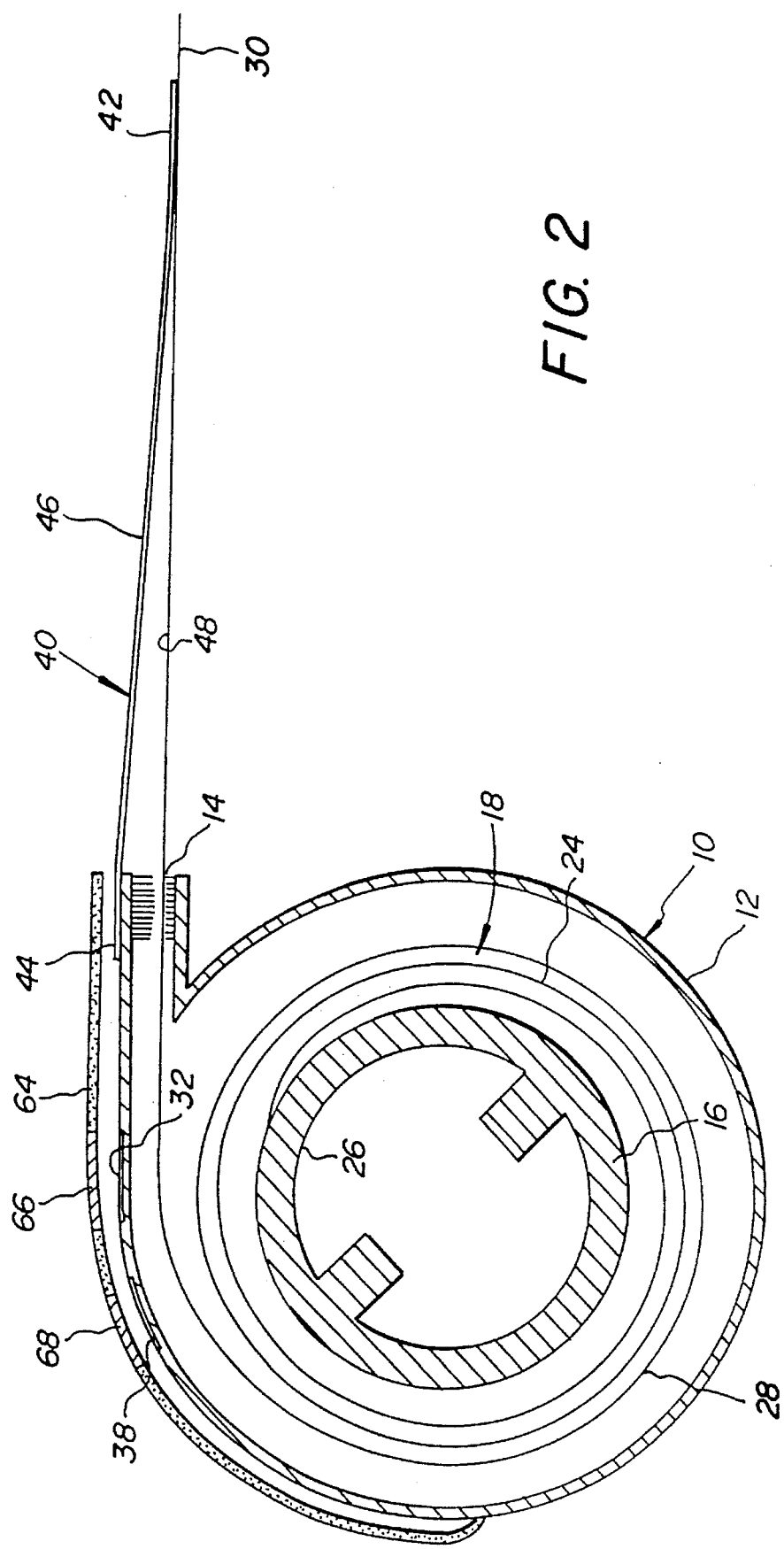

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–9 show a film cartridge 10 comprising a housing 12 with a plush-lined light-trapping film exit slit 14 and a flanged film spool 16 rotatably supported inside the housing. A known 35 mm filmstrip 18 having two identical series of edge perforations 20 inwardly adjacent respective longitudinal film edges 22 is loosely coiled in a film roll 24 about the film spool 16 between a pair of radial flanges, not shown, on the film spool. An inner end portion 26 of the filmstrip 18 is attached to the film spool 16. The first several frame lengths, i.e. 3–4 frame lengths, of the filmstrip 18 constitute a film leader 28. The film leader 28 forms an outermost convolution of the film roll 26, and it has a partly reduced-width leading end portion 30 that initially protrudes from the film exit slit 14. See FIGS. 1, 4 and 7.

A "FILM LOADED" 32 indicator is imprinted on the exterior of the housing 12 at a location that permits the indicator to be seen through a rear window 34 of a camera 36 when the cartridge 10 is in the camera. See FIGS. 1, 6, 9 and 11. A "FILM USED" indicator 38 is imprinted on the exterior of the housing 12 at a location that prevents the indicator from being seen through the rear window 34.

Figure 6:
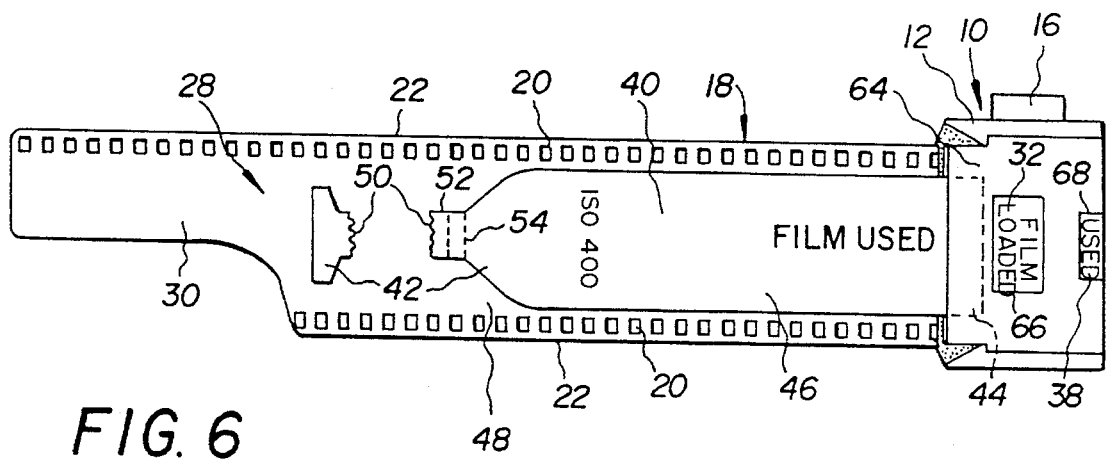
Figure 7:
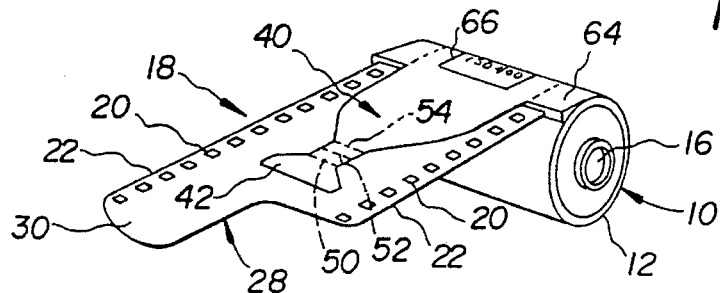
FIGS. 7, 8 and 9 are perspective views of the cartridge as seen in FIGS. 1, 2 and 3 respectively.
Figure 8:
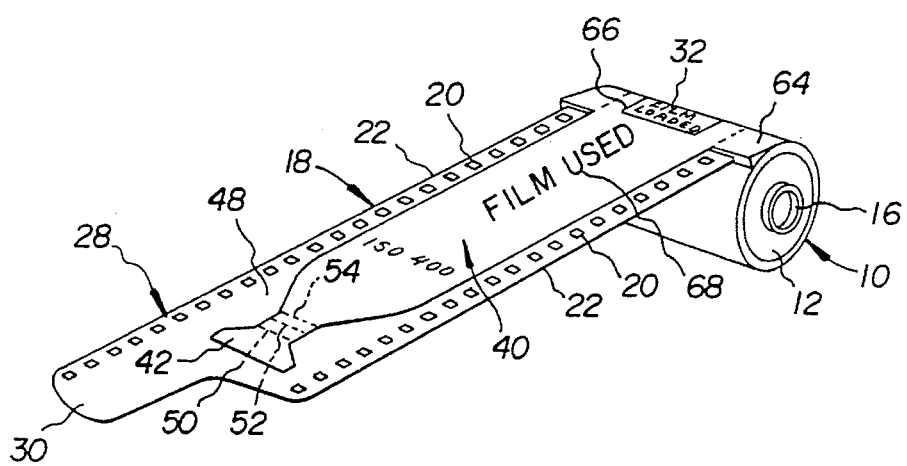
Figure 9:
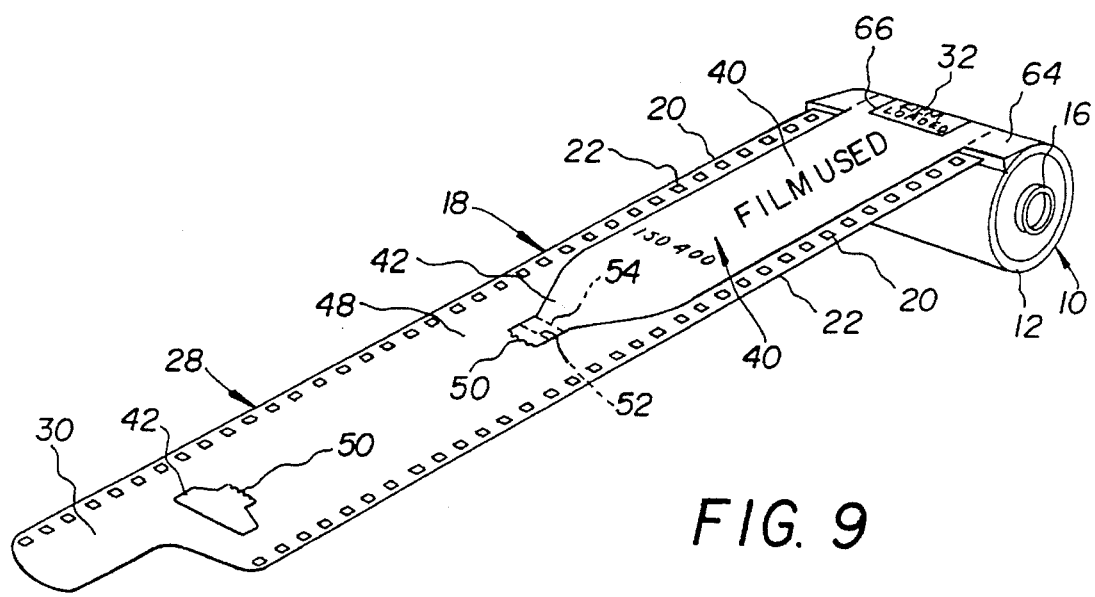

A flexible opaque protective cover strip 40 consists of a forward end portion 42, a rearward or trailing end portion 44 and an intermediate folded portion 46. See FIGS. 1–9. The cover strip 40 has a length and a width dimensioned to permit the cover strip to be able to rest on a non-emulsion side 48 of the filmstrip 18 between the two series of edge perforations 20 as shown in FIGS. 4 and 9, to completely cover successive frames of the filmstrip (at the non-emulsion side) when individual ones of the frames are positioned outside the housing 12 for exposure in the camera 36. The forward end portion 42 of the cover strip 40 is releaseably secured to the protruding leading end portion 30 of the film leader 28 as shown in FIGS. 1, 4 and 7. Release of the forward end portion 42 of the cover strip 40 from the protruding leading end portion 30 of the film leader 40 is accomplished by tearing the forward end portion at any one of three parallel weakened areas, such as perforated tear lines 50, 52 and 54, of the forward end portion. See FIGS. 3, 6 and 9. The trailing end portion 44 is permanently secured to the exterior of the housing 12 proximate the slit 14. The intermediate folded portion 46 is located on the exterior of the housing 12 to cover the "FILM LOADED" indicator 32 and the "FILM USED" indicator 38 as shown in FIGS. 1, 4 and 6, and it has a fold-line 56 that divides that portion into two superimposed top and bottom sections 58 and 60. As shown in FIG. 1, the bottom section 60 and the trailing end portion 44 are connected at a fold-line 62 proximate the film exit slit 14.

A substantially opaque open pocket 64 is secured to the exterior of the housing 12 to hold the intermediate folded portion 46 of the cover strip 40 in place over the "FILM LOADED" indicator 32 and the "FILM USED" indicator 38. The pocket 64 has respective transparent windows (or openings) 66 and 68 over the "FILM LOADED" indicator 32 and the "FILM USED" indicator 38.

Operation

Figure 10:
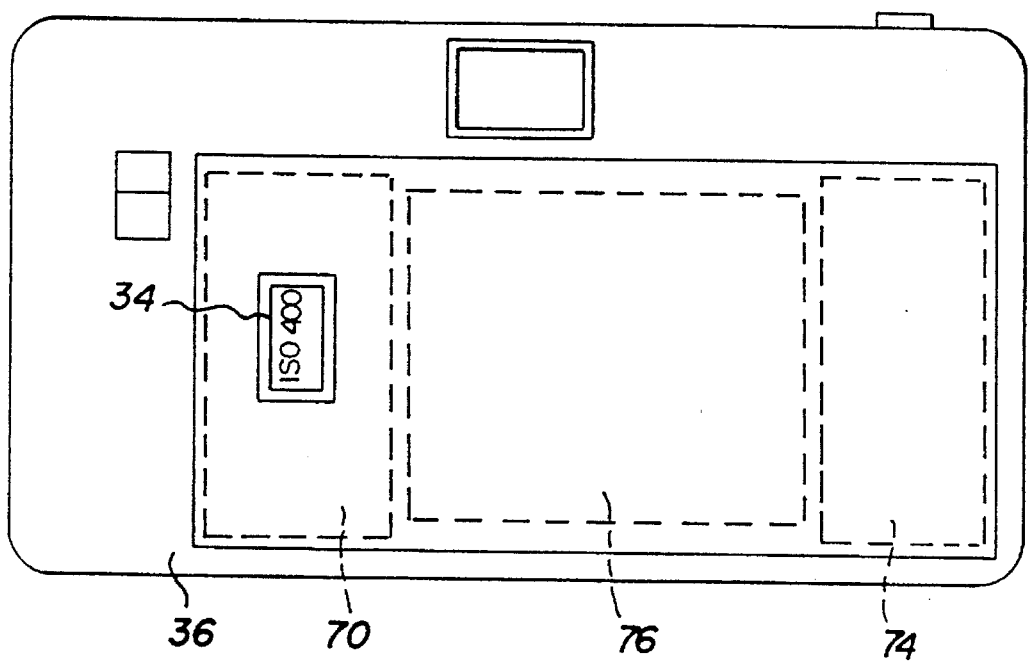
FIG. 10 is a rear elevation view of camera containing the cartridge as seen in FIG. 1.
Figure 11:
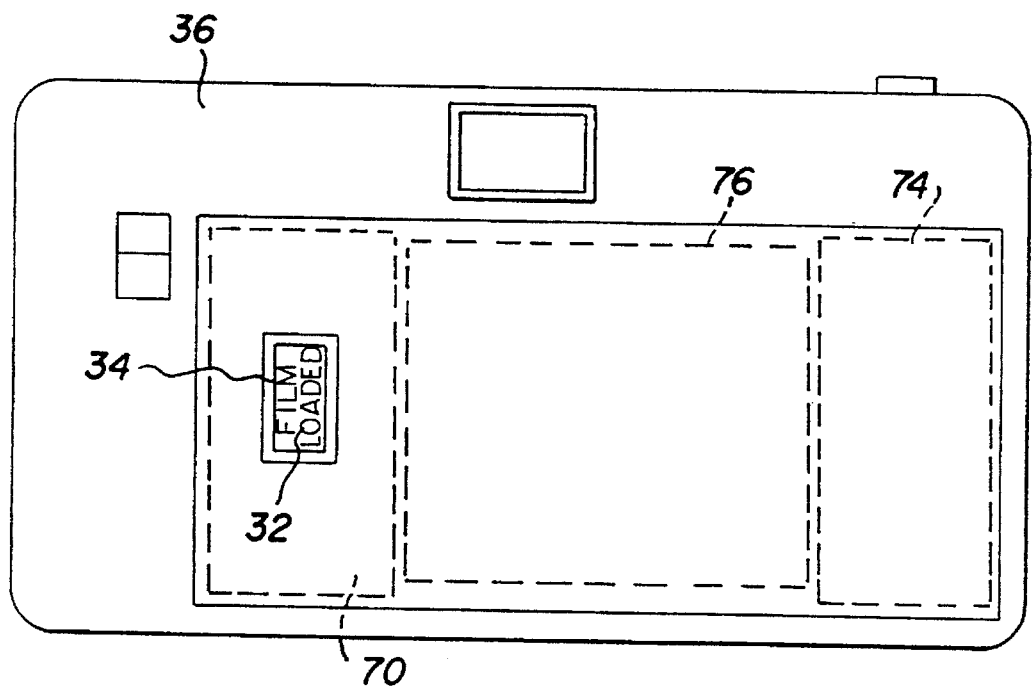
FIG. 11 is a rear elevation view of camera containing the cartridge as seen in FIG. 3.

When the cartridge 10 is inserted in a film supply or loading chamber 70 of the camera 36, the "FILM LOADED" indicator 32 cannot be seen (through the window 66 of the pocket 64) at the rear window 34 of the camera because the intermediate folded portion 46 of the cover strip 40 is covering the indicator. See FIG. 10.

The protruding leading end portion 30 of the film leader 28 is attached to a film take-up spool, not shown, within a film take-up chamber 72 in the camera 36 and the spool is windingly rotated to wind the protruding leading end portion onto the take-up spool and to unwind the remainder of the film leader 28, i.e. the outermost convolution of the film roll 26, off the film spool 16 and onto the take-up spool. As the film leader 28 is moved from the cartridge 10 and onto the take-up spool, the forward end portion 42 of the cover strip 40 is moved together with the leading end portion 30 of the film leader. Consequently, the top section 58 of the intermediate folded portion 46 of the cover strip 40 is pulled over the bottom section 60 of the intermediate folded portion, out of the pocket 64, and onto the non-emulsion side 48 of the filmstrip 18, which causes the intermediate folded portion to unfold at its fold-line 56 between the top and bottom sections. Then, the bottom section 60 of the intermediate folded portion 46 of the cover strip 40 is pulled out of the pocket 64 and onto the non-emulsion side 48 of the filmstrip 18, leaving only the trailing end portion 44 of the cover strip 40 (which is attached to the housing 12) within the pocket 64. See FIGS. 2, 4 and 7. When the bottom section 60 of the intermediate folded portion 46 of the cover strip 40 is pulled out of the pocket, it successively uncovers the "FILM USED" indicator 38 and the "FILM LOADED" indicator 32. See FIGS. 1–12. Thus, the "FILM LOADED" indicator 32 is not uncovered until the film leader 28 is substantially removed from the housing 12. This serves to verify that enough of the filmstrip 18, i.e. 3–4 frame lengths, has been unwound from the film spool 16 to wind the film leader 28 onto the take-up spool in order to accomplish film loading in the camera 36.

Figure 3:
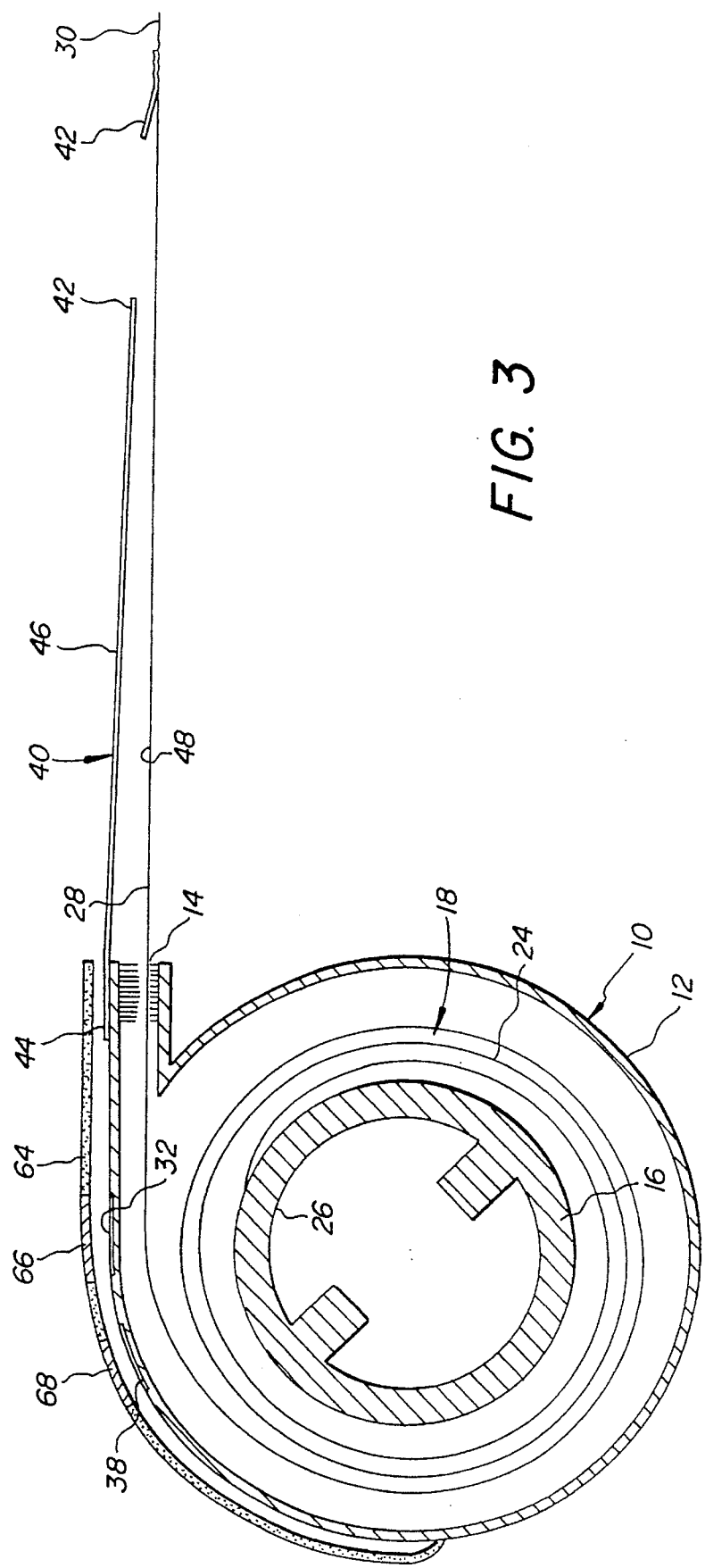
Figure 4:
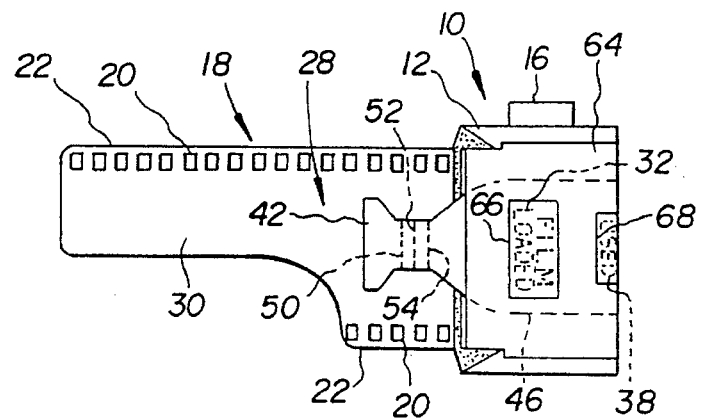
FIGS. 4, 5 and 6 are plan views of the cartridge as seen in FIGS. 1, 2 and 3 respectively.
Figure 5:
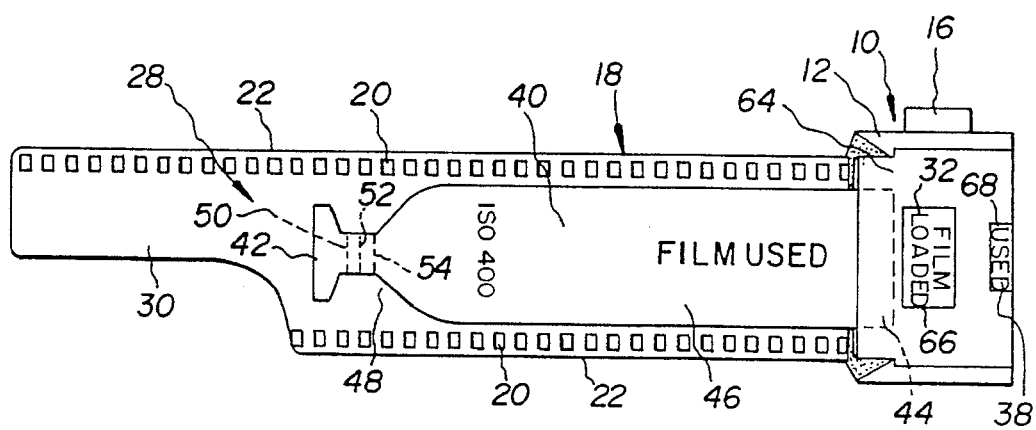

Further winding of the film leader 28 onto the take-up spool causes the forward end portion 42 of the cover strip 40 to disconnect from the film leader 28 at one of the three perforated tear lines 50, 52 and 54 as shown in FIGS. 3, 6 and 9. If none of the tear lines 50, 52 and 54 are yet wound onto the take-up spool, the forward end portion 42 of the cover strip 40 is disconnected from the film leader 28 at the first tear line 50. If only the tear line 50 is wound onto the take-up spool, the forward end portion 42 of the cover strip 40 is disconnected from the film leader 28 at the second tear line 52. If the tear lines 50 and 52 are wound onto the take-up spool, the forward end portion 42 of the cover strip 40 is disconnected from the film leader 28 at the third tear line 54.

Since the trailing end portion 44 of the cover strip 40 remains secured to the housing 12 as shown in FIG. 3, the cover strip remains on the non-emulsion side 48 of the filmstrip 18 when respective film frames of the filmstrip are positioned for exposure in the camera 36. In particular, the cover strip 40 is located between each one of the film frames that is positioned for exposure and a conventional film platen 76 in the camera. See FIG. 11. Thus, the cover strip 40 shields the non-emulsion side 48 of individual ones of the film frames against being slightly scratched by the film platen 74.

The invention has been described with reference to a preferred embodiment. However, it will be appreciated that variations and modifications can be effected by a person of ordinary skill in the art without departing from the scope of the invention.

PARTS LIST 10. film cartridge
12. housing 14. film exit slit
16. film spool
18. filmstrip
20. film perforations
22. longitudinal film edges
24. film roll
26. film inner end portion
28. film leader
30. protruding leading end portion
32. "FILM LOADED" indicator
34. rear window
36. camera
38. "FILM USED" indicator
40. protective cover strip
42. forward end portion
44. trailing end portion
46. intermediate folded portion
48. non-emulsion film side
50. tear line
52. tear line
54. tear line
56. fold-line
58. top strip section
60. bottom strip section
62. fold-line
64. pocket
66. pocket window
68. pocket window
70. supply chamber
74. take-up chamber
76. film platen

We claim:

1. A film cartridge comprising a housing with a film exit slit, and a film roll support rotatable inside said housing to unwind a filmstrip beginning with a film leader to permit said film leader to be moved outwardly through said slit to accomplish film loading in a camera, is characterized by:

a protective strip with a length and a width dimensioned to permit said protective strip to completely cover a non-emulsion side of successive frames of said filmstrip when individual ones of said frames are positioned outside said housing for exposure in a camera, said protective strip having a forward end portion releaseably secured to said film leader and a trailing end portion permanently secured to said housing to make the film leader first pull the protective strip onto the non-emulsion side of said filmstrip as the film leader is moved outwardly through said slit and then disconnect from the protective strip as the film leader is moved further from the housing, whereby said protective strip will remain on the non-emulsion side of said filmstrip to shield the non-emulsion side of individual ones of said frames when individual ones of the frames are positioned outside said housing for exposure in a camera.

2. A film cartridge as recited in claim 1, wherein a visible film-loaded indicator is located on said housing to be seen through a window in a camera, and said protective strip is originally covering said film-loaded indicator but is pulled off said film-loaded indicator when it is pulled onto the non-emulsion side of said filmstrip as the film leader is moved outwardly through said slit.

3. A film cartridge as recited in claim 1, wherein said filmstrip has a pair of longitudinal edges and a plurality of film perforations along at least one of said longitudinal edges, and said protective strip has a width that allows it to completely cover the non-emulsion side of successive frames of said filmstrip without covering said film perforations when individual ones of said frames are positioned outside said housing for exposure in a camera.

4. A film cartridge as recited in claim 1, wherein said forward end portion of the protective strip includes a plurality of weakened parallel areas arranged one after the other along said protective strip, each one of which can be individually torn to disconnect said film leader and said protective strip.

* * * * *